United States Patent [19]

Shiga

[11] Patent Number: 4,632,540
[45] Date of Patent: Dec. 30, 1986

[54] AUTOMATIC EXPOSURE DEVICE IN CAMERA FOR MICROFILM

[75] Inventor: Koji Shiga, Tokyo, Japan

[73] Assignee: Fuji Photo Film Co., Ltd., Kanagawa, Japan

[21] Appl. No.: 810,710

[22] Filed: Dec. 19, 1985

[30] Foreign Application Priority Data

Dec. 19, 1984 [JP] Japan .................................. 59-268103

[51] Int. Cl.[4] ........................ G03B 27/74; G03B 27/80
[52] U.S. Cl. ..................................................... 355/68
[58] Field of Search ........................................... 355/68

[56] References Cited

U.S. PATENT DOCUMENTS 3,704,947 12/1972 Reimann ............................... 355/68
3,817,617 6/1974 Weinert .................................. 355/68
4,379,632 4/1983 Dedden et al. ....................... 355/68

*Primary Examiner*—Monroe H. Hayes
*Attorney, Agent, or Firm*—Wenderoth, Lind & Ponack

[57] ABSTRACT

In recording original images such as manuscripts on microfilm, it is necessary to expose the images at an appropriate amount of light which well corresponds with the original density. According to the present invention, there is provided only one sensor for detecting the density of the original images, making it possible to quickly detect the overall density of the original image. The result of the above photometry permits exposure of a microfilm with an amount of light which makes the lightest portion of the microfilmed images constant in density, thereby to achieve high quality control of microfilming process.

8 Claims, 4 Drawing Figures

AUTOMATIC EXPOSURE DEVICE IN CAMERA FOR MICROFILM

BACKGROUND OF THE INVENTION

The present invention relates to an automatic exposure device in camera for exposing original images on a microfilm.

In recording original images such as manuscript, photographs and documents on a microfilm, it is necessary to detect the overall density of the original images in order to expose those original images with an adequate exposure corresponding with the images.

In the prior art, sensors 2A to 2E as shown in FIG. 1 (e.g. photo sensors such as photodiodes) were provided at plural positions to measure the overall density data of the original image 1 and determine the exposure by means of a circuit as shown in FIG. 2 for exposing the original 1. Data on density (or amount of light) measured by the five sensors 2A to 2E are inputted at a switch 3, where one of the density data is selected by contact points a to e of the switch 3, converted into a digital value by an A/D converter 4 and inputted to a CPU 5 such as a micro-processor. The CPU 5 successively switches the contact points a to e of the switch 3 so as to detect all the density data from the sensors 2A to 2E. After obtaining all the necessary data on the density from the sensors 2A to 2E by means of the CPU 5, an operator manipulates keys 6 to calculate the exposure from a given operational equation. By controlling the speed of a shutter 7 which exposes the microfilm with the calculated exposure, an adequate exposure which corresponds well with the density of the original image is automatically achieved.

The conventional automatic exposure device is defective in that since plural sensors are provided and successively scanned to obtain the density data, attaching of the sensors is quite troublesome and photometric operation itself complicated, pushing up the cost.

SUMMARY OF THE INVENTION

The present invention has been contrived in view of the above, and aims to provide an automatic exposure device which comprises only one sensor and which can quickly detect the overall density of the original image.

Another object of the present invention is to provide an automatic exposure device which controls the exposure in a manner that the density of the lightest portions of microfilmed images becomes constant to thereby improve the quality of microfilmed images.

According to the present invention in one aspect thereof, for achieving objects described above, there is provided an automatic exposure device for microfilm camera which exposes original images on microfilm, comprising a lens unit made of an opaque material which is arranged on an optical axis perpendicular to the original image and which is inserted therein with a light receiving lens at a position eccentric from the optical axis, a driving mechanism which rotates the lens unit about the optical axis, and a sensor which detects density at a photometric spot of the original image focused by the light receiving lens, so that the entire original image is photometrically measured for its density by the rotation of the lens unit to determine the exposure.

According to the present invention in another aspect thereof, there is provided an automatic exposure device comprising an exposure mechanism which exposes original images on microfilm via a shutter, a lens unit made of an opaque material which is arranged on an optical axis perpendicular to the original image and which is inserted therein with a light receiving lens at a position eccentric from the optical axis, a driving mechanism which rotates the lens unit about the optical axis, a sensor which detects density at a photometric spot of the original image focused by the light receiving lens, a peak hold circuit which holds the peak value of an output signal from the sensor, a control/operation means which controls the shutter and the driving mechanism and calculates the exposure of the original image based on the peak value. The nature, principle and utility of the invention will become more apparent from the following detailed description when read in conjunction with the accompanying drawings.

DETAILED DESCRIPTION OF THE INVENTION

Figure 1:
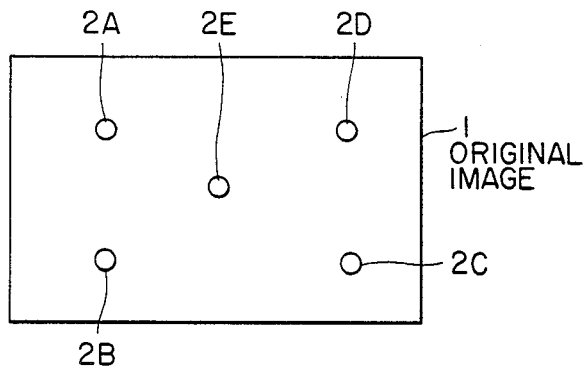
FIG. 1 is a view to show the conventional photometry.
Figure 2:
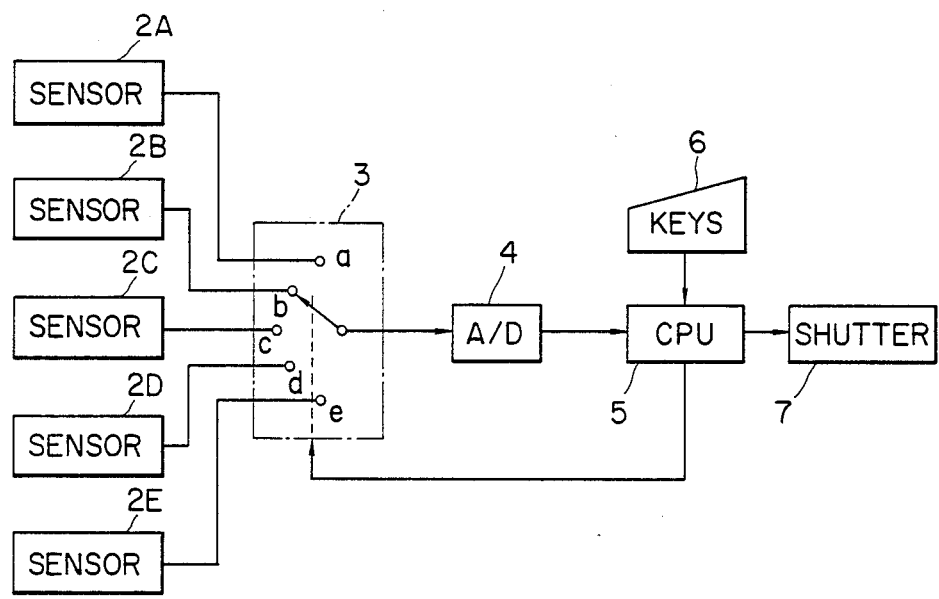
FIG. 2 is a block diagram to show one example of control circuit thereof.
Figure 3:
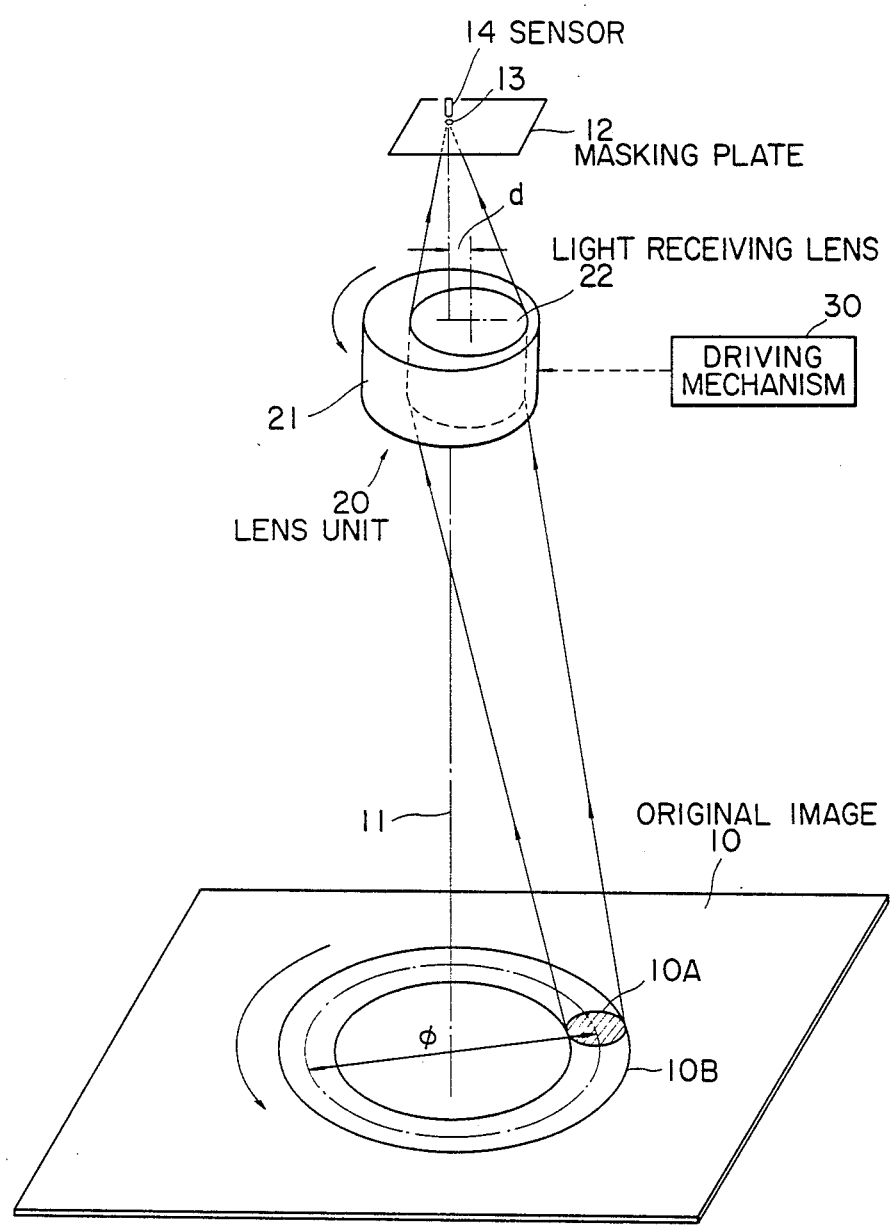
FIG. 3 shows one embodiment of the optical system according to the present invention.

FIG. 3 shows one embodiment of the optical system according to the present invention. A lens unit 20 is arranged on an optical axis 11 which is perpendicular to the substantial center of an original image 10. The lens unit 20 is rotated in one direction by means of a driving mechanism 30. The lens unit 20 has a cylindrical lens holder 21 made of an opaque material which does not transmit light. A light receiving lens 22 is inserted in the lens holder 21 eccentrically by or at a distance d from the center of the optical axis 11. A sensor 14 is provided at the focusing point of the light receiving lens 22. A masking plate 12 is provided in front of the sensor 14 for shielding light. The light from the light receiving lens 22 is inputted to the sensor 14 via a pin-hole 13 made on the masking plate 12. With this construction, data obtained at a photometric spot 10A of the original image 10 is inputted to the sensor 14 in terms of the light amount via the light receiving lens 22 and the pin-hole 13. By rotating the lens unit 20 with the driving mechanism 30, the photometric spot 10A is caused to revolve in the same direction. Thus, as the lens unit 20 is rotated once about the optical axis 11, the sensor 14 detects a region in a doughnut-form as indicated by the reference number 10B to give data on the original image 10.

Figure 4:
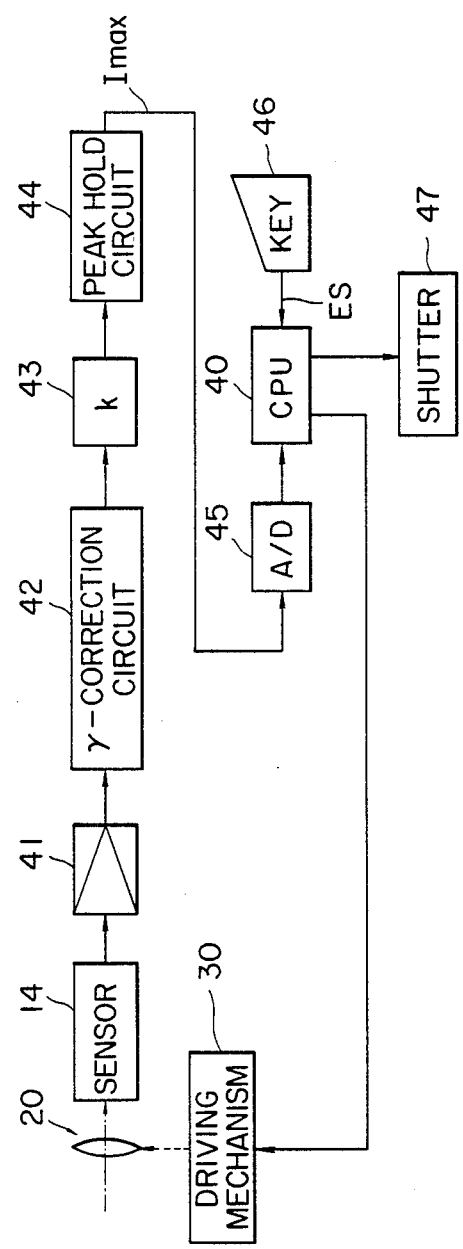
FIG. 4 is a block diagram to show one example of control circuit thereof.

Referring to FIG. 4 which shows a block diagram of the automatic exposure device, the detected signal from the sensor 14 is amplified by an amplifier 41 and corrected at a γ-correction circuit 42 in accordance with the photosensitivity characterisitics of the microfilm. After an appropriate gain is obtained at a gain adjusting circuit 43, the signal is inputted to a peak hold circuit 44. The peak hold circuit 44 detects and holds the peak value Imax of the input signal. The peak value Imax is converted into a digital value by a A/D converter 45 and then inputted to a CPU 40 to calculate an exposure from a given operational equation. As a signal ES for starting exposure of images is inputted from a key 46, the speed of a shutter 47 is controlled in accordance with the operational result to effect exposure on the microfilm by means of a known exposure mechanism. It is noted that the CPU 40 controls the driving mechanism 30 as well.

In the above construction, the diameter $\phi$ of the photometric region 10B is expressed as follows, if it is assumed that the eccentricity of the light receiving lens 22 from the optical axis 11 is denoted as d and the magnification thereof as m;

$$\phi = d \times 2 \times m + 2d \qquad (1)$$

The eccentricity d is set at a value such that photometric spot 10A will not deviate from the area of the original image 10 and yet will be able to detect the whole image data. In exposing the original image 10 on a microfilm, the CPU 40 causes the lens unit 20 to rotate once via the driving mechanism 30 at a given rate, e.g. 600 rpm, whereupon the photometric spot 10A will revolve over the region 10B on the original image 10, supplying image data to the sensor 14. As the detected signal from the sensor 14 is inputted to the peak hold circuit 44 via the amplifier 41, the $\gamma$-correction circuit 42 and the gain adjusting circuit 43, the peak value of light or the maximum (or the minimum) density at the region 10B can be detected. By calculating an exposure which makes the density of microfilm against the measured maximum density become constant, the shutter speed is determined.

Assuming the peak light value held at the peak hold circuit 44 is given as Imax, the exposure E is expressed as follows with a constant C:

$$E = I\text{max} \cdot t = C \qquad (2)$$

and the shutter speed t is expressed as:

$$t = C/I\text{max} \qquad (3)$$

The CPU 40 calculates the exposure on the basis of the above equations. As the key 46 indicates start of operation, the CPU 40 actuates the shutter 47 at a speed calculated by the above equation (3) and exposes the microfilm with an exposure or the amount of light which makes the density on the lightest region of the original image 10 constant.

As described in the foregoing, according to the automatic exposure device for microfilm camera, the image density data on the whole original image can be detected with only one sensor. With the result of such photometry the microfilm can be exposed with the amount of light which makes the density of the lightest portion of the original image always constant, thereby allowing microfilming process to be conducted simply with the same conditions constantly.

It should be understood that many modifications and adaptations of the invention will become apparent to those skilled in the art and it is intended to encompass such obvious modifications and changes in the scope of the claim appended hereto.

What is claimed is:

1. An automatic exposure device for microfilm camera which exposes original images on microfilm, comprising a lens unit made of an opaque material which is arranged on an optical axis perpendicular to the original image and which is inserted therein with a light receiving lens at a position eccentric from the optial axis, a driving mechanism which rotates the lens unit about the optical axis, and a sensor which detects density at a photometric spot of the original image focused by the light receiving lens, so that the entire original image is photometrically measured for its density by the rotation of the lens unit to determine the exposure.

2. The automatic exposure device as claimed in claim 1, wherein the photometric spot on the original image is made to remain within the area of the original image.

3. The automatic exposure device as claimed in claim 1, wherein the number of said sensor is one.

4. The automatic exposure device as claimed in claim 3, wherein a masking plate is provided in front of the sensor so that photometric measure is conducted through a pin-hole made on said mask.

5. The automatic exposure device as claimed in claim 3 wherein said sensor is a photodiode.

6. An automatic exposure device comprising an exposure mechanism which exposes original images on microfilm via a shutter, a lens unit made of an opaque material which is arranged on an optical axis perpendicular to the original image and which is inserted therein with a light receiving lens at a position eccentric from the optical axis, a driving mechanism which rotates the lens unit about the optical axis, a sensor which detects density at a photometric spot of the original image focused by the light receiving lens, a peak hold circuit which holds the peak value of an output signal from the sensor, a control/operation means which controls the shutter and the driving mechanism and calculates the exposure of the original image based on the peak value.

7. The automatic exposure device as claimed in claim 6, wherein a circuit for $\gamma$-correction of the output signal from the sensor is provided at upstream of the peak hold circuit.

8. The automatic exposure device as claimed in claim 6, wherein a signal indicating the start of exposing operation is inputted from a key to the control/operation means.

* * * * *